Dec. 15, 1959  C. O. CLARKE  2,917,111
AUTOMOTIVE SHADE SCREEN
Filed Nov. 28, 1958  2 Sheets-Sheet 1

CHARLES O. CLARKE
INVENTOR.

BY Loyd J. Miller
ATTORNEY

Dec. 15, 1959  C. O. CLARKE  2,917,111
AUTOMOTIVE SHADE SCREEN
Filed Nov. 28, 1958  2 Sheets-Sheet 2

CHARLES O. CLARKE
INVENTOR.

BY Loyal J. Miller
ATTORNEY

United States Patent Office 2,917,111
Patented Dec. 15, 1959

2,917,111

AUTOMOTIVE SHADE SCREEN

Charles O. Clarke, Oklahoma City, Okla.

Application November 28, 1958, Serial No. 776,960

3 Claims. (Cl. 160—91)

The present invention relates to vehicle window screens and more particularly to a removable window screen for use with automobiles and the like.

It is highly desirable during the summer months to provide shade screens for automobile windows which may be easily installed and removed. Many automobiles have air conditioning equipment installed therein which, when in use, necessitates that the windows of the vehicle be closed; and since the light rays of the sun strike the window panes without any shield therefor, heat from the sun rays is trapped within the vehicle thus causing an additional load to be carried by the air conditioning equipment in maintaining the inside temperature of the vehicle at the desired level.

None of the window screens for vehicles, shown by the prior art which I have examined, are intended to be used or positioned within the window frame exteriorly of the glass panel therein. Therefore, when such screens are used interiorly of the window on air-conditioned automobiles, the principal purpose, namely interrupting the sun rays, is defeated because heat from the sun is trapped within the vehicle. Therefore, it is critical that the shade screen be installed exteriorly of the vehicle window panel. None of the devices shown by the prior art features a window screen which may be connected to the doors or window openings of hard-top model automobiles wherein the front doors thereof do not provide a complete window frame.

It is, therefore, the principal object of the present invention to provide a window screen which is positioned in an automotive window frame, exteriorly of the glass window panel, for reflecting sun rays.

A similarly important object is to provide a screen wherein fixed position louver-type screening material is tautly positioned therein thus forming a shade for the window pane.

Another object is to provide a screen frame which is removably held in place in a vehicle opening by brackets connected to the screen frame and removably inserted inwardly of the window frame for holding the screen frame in place.

A further object is to provide a screen frame of this class which permits opening and closing operation of the glass window panel without interference therewith.

Still another object is to provide screen frames which are locked in place with the locking of the vehicle and, therefore, cannot be removed by unauthorized persons.

Another object is to provide window screens of this class which, when used on automobiles with or without air conditioning, permits the windows to be lowered and the automobile locked when not in use and wherein the interior of the vehicle will be at least as cool as the outside atmosphere at all times.

An additional object is to provide a window shade screen which may be used on automobile bodies commonly known as hard-top models.

Still another object is to provide screens of this class which are rigid in construction and which will last throughout the life of the car.

The present invention accomplishes these and other objects by providing a shade screen having a frame with substantially the same outer dimensions as the inner dimensions of a vehicle window opening and including fixed position louver screen material tautly secured between the respective sides of the screen frame. Bracket or clips secured to the screen frame project outwardly thereof and inwardly of the window frame adjacent the outer surface of the glass run channel and exteriorly of the glass window panel.

Other objects will be apparent from the following description when taken in conjunction with the accompanying two sheets of drawings, wherein.

Figure 1:
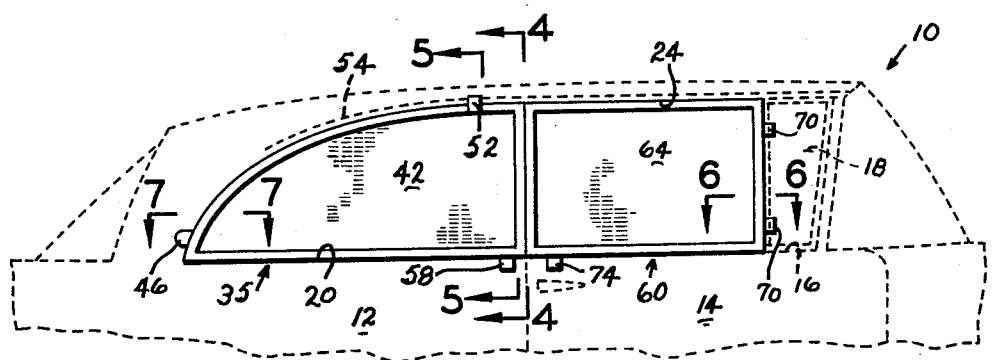
Figure 1 is a fragmentary side elevational view of an automobile, shown in dotted lines, and illustrating, in solid lines, the present invention installed therein.
Figure 2:
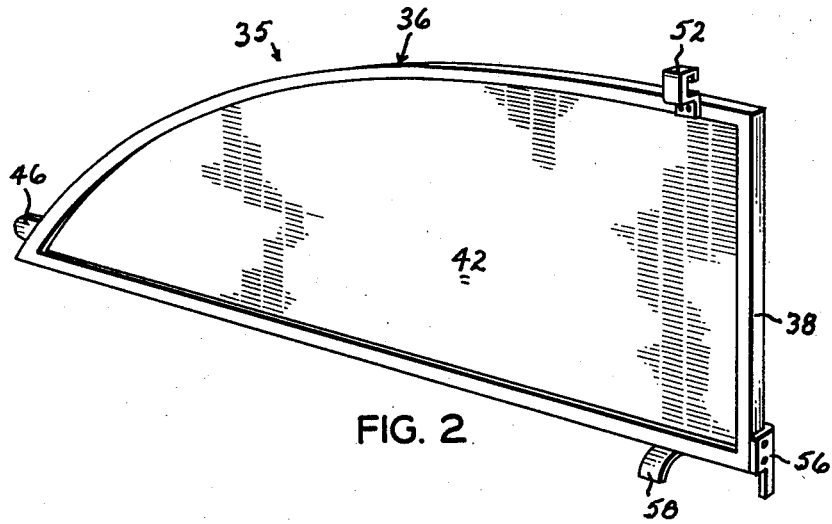
Figure 2 is a perspective view of the shade screen device for the rear side window opening of the vehicle illustrated in Fig. 1.
Figure 4:
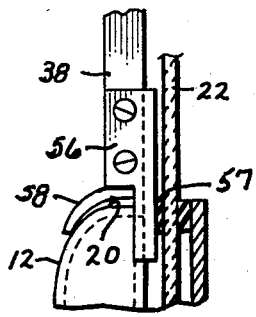
Figure 5:
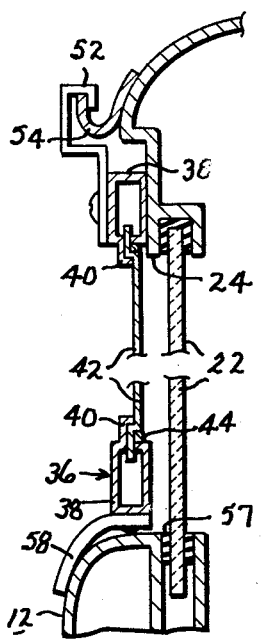
Figure 8:
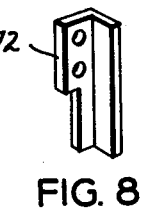
Figure 7:
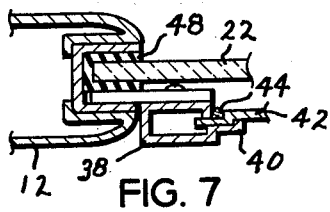
Figure 6:
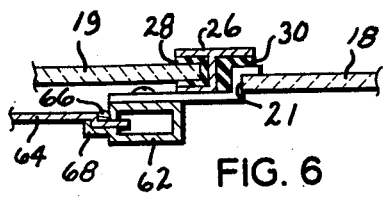

Figures 4 and 5 are fragmentary vertical cross-sectional views, partly in elevation, taken substantially along the lines 4—4 and 5—5, respectively, of Fig. 1;

Figures 6 and 7 are fragmentary horizontal cross-sectional views, partly in elevation, taken substantially along the lines 6—6 and 7—7, respectively, of Fig. 1; and, Figure 8 is a perspective view of one of the mounting brackets, per se.

Like characters of reference designate like parts in those figures of the drawings in which they occur.

In the drawings:

Referring to the drawings, there is shown, in dotted lines, an automobile of the closed type. The particular type illustrated is commonly known as a two-door hard-top in which vertically movable glass windowpanes are provided in window frames integrally formed in the body side portion rearwardly of the doors and vertically movable glass window panes are also provided in window frames integrally formed in the front doors, except for the forward portion thereof which have the usual ventilating wing members pivotally mounted for movement about a vertical axis.

While the present invention is described for use in connection with a particular body type automobile it is to be understood that the invention may be used on other body types of automobiles, truck cab doors or any other type vehicle wherein the windows are movable vertically in opening and closing.

The reference numeral 10 indicates, as a whole, an automobile having a body portion 12 and a door 14. The door 14 is provided with the usual window opening 16 and a forward ventilating glass panel wing or member 18. The body is provided with an opening 20 rearwardly of the door which may be closed by a glass window panel 22 (Fig. 5). The lower edge 24 of the top of the hard-top model of automobile illustrated forms the upper portion of the window frame. The door glass window panel 19 and the rear glass window panel 22, in hard-top model automobiles, meet at their respective rearward and forward edges when in closed position to complete the closing of the vehicle. A short channel like post or standard 26 secured to the door forms a part of the framing for the wing panel 18 and forms a support for a glass run channel 28 which guides the forward vertical edge of the door glass panel 19 and which features a strip of resilient material 30, such as rubber, secured to the post 26 for receiving the rearward edge of the wing member 18 when in closed position (Fig. 6).

The shade screen for the rear side window panel 22, indicated generally at 35, includes an endless screen frame 36, preferably formed of suitable light weight metallic material 38, having a peripheral edge with dimensions substantially conforming to the inner dimensions of the window opening defined by the vehicle body opening edges 20, 24 and the forward vertical edge of the window panel 22 when in closed position. The frame material 38 is rectangular box-like in cross section, as shown in the drawings, which provides sufficient rigidity for maintaining the screen in place and which overcomes wind velocities generated by the movement of the vehicle which might otherwise cause the screen to vibrate or rattle against the body surfaces. The box-like frame material 38 includes a substantially L-shaped flanged edge 40 which projects inwardly of the frame 36. Shade screen material 42, commonly known as Venetian shade screen, which comprises a relatively thin sheet of metal, preferably aluminum, having a plurality of parallel closely spaced slits or slots formed in spaced rows spans the distance between the inwardly disposed surfaces of the screen frame 36 and is tautly held thereby. The shade screen material 42 adjacent the respective slot is deformed laterally of the plane of the material to form a plurality of relatively small parallel fixed position slats or louvers which, when vertically positioned with the louvers toward the sun, form a shade or shield by interrupting the rays from the sun. As illustrated in the drawings the shade screening material 42 is inserted into the slot adjacent the flange 40 formed on the inner surface of the frame material 38 and is held in this position by a rod-like strip of flexible material 44 bearing against the adjacent surface of the screen frame and the screen material which in turn contacts the hooked end portion of the flange 40.

The shade screen device 35 is installed and held in place within the automobile rear side window opening by a flat metallic clip or bracket 46 connected to the inward side surface of the screen framing 36 and which projects rearwardly of the screen frame and is adapted to be removably inserted inwardly of the vehicle framing defining the rearward portion of the window opening between the outer surface of the glass run channel 48 and the window framing 50 (Fig. 7). A hook-shaped bracket 52 is connected to the outer surface of the screen frame 36 and projects upwardly therefrom for co-operating engagement with the upper surface of a conventional drip rail 54 (Fig. 5). A post-like bracket member is connected in depending relation to the outer surface of the forward end of the screen frame 36. The post bracket 56 is L-shaped and is adapted to engage the forward inner surface of the vehicle defining the juncture of the vehicle body with the door adjacent the glass panel guide 57. Thus, the post 56 prevents rearward movement of the frame and simultaneously prevents outward movement of the frame with respect to the window framing. The frame 35 is further maintained in position against any inward pressure applied to the frame which would force the frame against the glass 22 by an arcuate depending bracket or clip 58 secured to the lower surface of the frame and which projects outwardly above and contacts the surface of the vehicle side. The screen frame 35 is installed in the position shown in Fig. 1 by manually sliding the same rearwardly into the window framing, with the vehicle door 14 in open position, after engaging the hooked bracket 52 with the drip rail 54.

Figure 3:
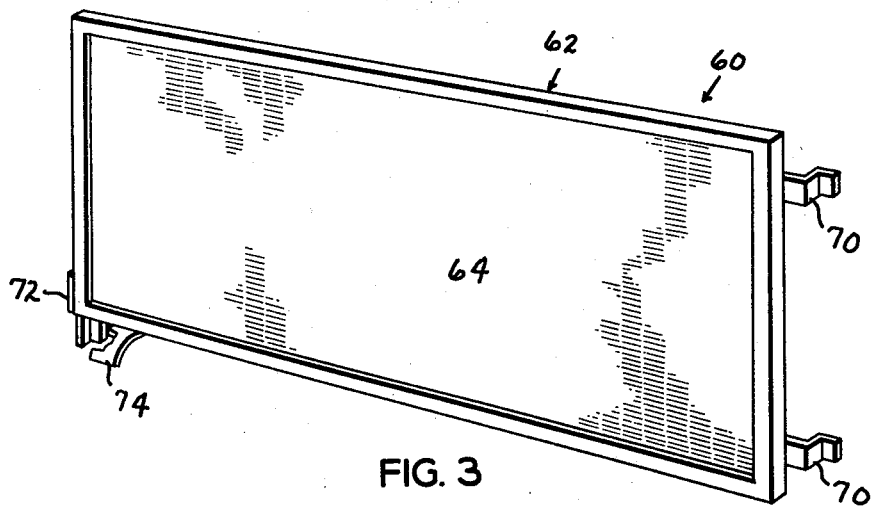
Figure 3 is a perspective view of the shade screen for the door window opening.

The shade screen 60, illustrated in Figs. 1 and 3, for the vehicle door opening is rectangular in general configuration and is similarly formed with respect to the screen 35 having a frame 62 formed with a periphery having outer dimensions substantially equal to the dimensions defining the door window area and including Venetian type shade screen material 64 similarly tautly retained within the frame 62 by a strip 66 engaging the screening and a similar flange portion 68 (Fig. 6).

The shade screen 60 is positioned adjacent the outward surface of the door glass panel 19 with the wing member 18 in pivoted open position and is held in place by a pair of brackets 70 connected at one end to the inward vertical edge of the screen frame 62 and which have a Z-shaped free end portion for co-operatively contacting the outwardly disposed surface of the resilient strip 30. The wing member 18 is then pivoted to its closed position wherein the rearward vertical edge 21 of the glass thereof contacts the brackets 70. The rearward lower end of the screen has a post or depending bracket 72, similar to the bracket 56 which contacts the rearward vertical and adjacent inwardly disposed portion of the door 14 thus firmly positioning the screen 60 against movement laterally with respect to the door. A depending arcuate bracket 74, similar to the bracket 58, is connected to the lower surface of the rearward end portion of the frame 62 which prevents movement of the screen inwardly of the door window opening.

Obviously the surfaces of the various brackets contacting the vehicle may be coated or covered with padding or resilient material to preclude scratching or damage to the finish of the vehicle.

Thus, it may be seen that when the door and the wing member 18 is in closed position and locked the screen 60 cannot be removed and that the rear screen 35 cannot be removed from the rear window opening.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A screen and bracket construction for being removably positioned within the window frame opening of a vehicle door formed with a glass run channel for the glass window panel, said window frame opening having a ventilating member at one end with one edge thereof movable into and out of contact with the adjacent glass run channel, said construction comprising: a screen having a rigid frame with substantially the same outer dimensions as the inner dimensions of said window frame exclusive of the area occupied by said ventilating member and having fixed position louver-screen material tautly secured in said frame; a pair of brackets secured in vertically spaced-apart relation to the end of said screen frame adjacent said ventilating member, said pair of brackets each having a free end portion co-operatively formed with respect to the outer surface of the adjacent glass run channel for securing said screen frame in said window opening exteriorly of and substantially parallel with respect to the closed position of said window panel whereby the said one edge of the ventilating member, when in closed position, impinges said pair of brackets against the glass run channel; and at least one bracket secured to the end of said screen frame opposite said pair of brackets and adapted to be inserted inwardly of said window frame opening.

2. A screen and bracket construction for being removably positioned within the window frame opening of a vehicle door opening formed with a glass run channel for the glass window panel, said window frame opening having a ventilating member at its forward end portion with one edge thereof movable into and out of contact with the adjacent outwardly disposed surface of the glass run channel, said construction comprising: a screen having an endless rigid frame with substantially the same outer dimensions as the inner dimensions of said window frame exclusive of the area occupied by said ventilating member and having louvered-screen material spanning the distance between the inward side surfaces of said frame and tautly secured thereto by its marginal edges; a pair of brackets secured in vertically spaced-apart relation to the forward end of said screen frame adjacent said ventilating member, said pair of brackets each having a free end portion co-operatively formed for contiguous contact with a portion of the outer surface of the adjacent glass run channel for securing said screen frame in said window opening exteriorly of and substantially parallel with respect to the closed position of said glass window panel whereby the said one edge of the ventilating member, when in closed position, impinges the free end portion of said pair of brackets against the glass run channel; a first single bracket secured in depending relation to the end portion of said screen frame opposite said pair of brackets and adapted to be inserted inwardly and downwardly of the lower limit of said window frame opening for preventing outward movement of the rearward end portion of said screen frame with respect to said window frame opening; and a second single bracket secured to the outer surface of the rearward end portion of said screen frame, said second single bracket extending arcuately outward and downward and adapted to contact the surface of the vehicle door adjacent the window opening for preventing inward movement of said screen frame with respect to the window opening.

3. A screen and bracket construction for being removably positioned within the window frame opening of a vehicle door opening formed with a glass run channel for the glass window panel, said window frame opening having a ventilating member at its forward end portion with one edge thereof movable into and out of contact with the adjacent outwardly disposed surface of the glass run channel, said construction comprising: an endless frame having substantially the same outer dimensions as the inner dimensions of said window frame exclusive of the area occupied by said ventilating member; louvered metallic screen material spanning the distance between the respective opposing inward side surfaces of said frame and tautly secured thereto by its marginal edges, said louvered-screen material consisting of vertical rows of spaced parallel slats joined by vertical imperforate strips; a pair of substantially Z-shaped brackets secured in vertically spaced-apart relation to the forward end of said frame adjacent said ventilating member, the free end portion of each of said pair of brackets contiguously contacting the outwardly disposed surface of said glass run channel and being coextensive with respect to the forward edge of the latter for securing said frame in said window opening exteriorly of and substantially parallel with respect to the closed position of said window panel whereby the said one edge of the ventilating member, when in closed position, impinges the free end portion of said pair of Z-shaped brackets against the glass run channel; a first single bracket secured in depending relation to the end portion of said frame opposite said pair of brackets and adapted to be inserted inwardly and downwardly of the upper limit of said window frame opening for preventing outward movement of the rearward end portion of said frame with respect to said window frame opening; and a second single bracket secured to the outer surface of the rearward end portion of said frame, said second single bracket extending arcuately outward and downward and adapted to contact the surface of the vehicle door adjacent the window opening for preventing inward movement of said frame with respect to the window opening.

References Cited in the file of this patent

UNITED STATES PATENTS

| | | |
|---|---|---|
| 1,584,910 | Volker | May 18, 1926 |
| 1,705,442 | Dominick | Mar. 12, 1929 |
| 1,753,866 | McCormack | Apr. 8, 1930 |
| 1,814,322 | McCormack | July 14, 1931 |
| 2,784,781 | Rhodes | Mar. 12, 1957 |